March 22, 1966 C. W. THORNTHWAITE ETAL 3,241,436

DIRECT DIGITAL PRINT-OUT DATA RECORDING APPARATUS

Filed April 16, 1963 3 Sheets-Sheet 1

March 22, 1966 C. W. THORNTHWAITE ETAL 3,241,436

DIRECT DIGITAL PRINT-OUT DATA RECORDING APPARATUS

Filed April 16, 1963 3 Sheets-Sheet 3

United States Patent Office 3,241,436
Patented Mar. 22, 1966

3,241,436
DIRECT DIGITAL PRINT-OUT DATA RECORDING APPARATUS

Charles Warren Thornthwaite, Elmer, William John Superior, Seabrook, and Kazuyuki Ray Ono, Elmer, N.J., assignors to C. W. Thornthwaite Associates, Elmer, N.J., a corporation of New Jersey Filed Apr. 16, 1963, Ser. No. 273,324
3 Claims. (Cl. 88—24)

This invention pertains to apparatus for making permanent photographic or photoprint records of the readings or indications of registers or similar data-manifesting devices. In particular, the invention enables large numbers of such readings to be permanently recorded, in a desired time sequence, on a single frame or photoprint of the type conveniently produced by a "Polaroid" camera or similar photographic equipment of the still picture type.

Photographic data recorders of the oscillographic or moving film types are well known, as are photographic meter-reading cameras, voting machine registers and the like. These require extensive film or paper processing before the data can be obtained, and such of them as record analog traces further involve data reduction or calculating operations before the desired information can be obtained in numerical form.

The present invention aims to provide a compact, self-contained apparatus including a plurality of individual numerical registers together with equipment for photographing their readings or indications in serial order, at predetermined periods, on a single stationary frame or photoprint area, to yield a composite photographic record covering a predetermined period of time. At stated times, the user can readily remove the fully processed digital record for the preceding interval, and advance a fresh film or print section for recording in the next interval.

The invention thus meets the requirements for an automatic direct digital recording of the simultaneous readings of a plurality of registers, counters or the like at stated intervals, to yield a permanent and accurate digital record of the desired values, without dependence upon the skill, accuracy or even attendance of a number of human operators. It is of special value in situations where the recording of time-correlated readings of a plurality of variables at spaced intervals of time during a period of several hours or days will satisfy the requirements of the system, but it can also be used for other succession rates, as will appear.

Briefly, the invention accomplishes its objects by apparatus provided with a plurality of digital registers to receive and display, in an array of one or more regular rows, the varying counts or other registrations to be recorded. An enclosing housing or the like contains means for illuminating the reading faces of these registers, and for imaging or projecting the indications, preferably on a reduced scale, upon a fractional area of a stationary photosensitive recording medium such as the picture area of a Polaroid camera. Timing devices are provided for momentarily opening a shutter and/or energizing the illuminating means, to make one photographic registration of all of the readings, and for thereupon advancing a portion of the imaging system to a new position in preparation for making the next record of the registrations upon an adjacent fractional area of the same frame or film. The period between exposures may be externally controlled, but more usually will be established by the timing device or program control motor which also controls the exposing means and the optical system.

With a conventional Polaroid film frame size of about 2¾ by 3¾ inches, and a linear array of (for example) nine five-digit registers of the Veeder-Root type, the optical reduction can readily be chosen so as to provide a total of 54 lines of directly-readable meter indications on a single frame or picture. Thus, the time-correlated readings of up to nine variables can be recorded at 30 minute intervals over a period of over 24 hours, before it will be necessary to advance or change the film of the camera. It will be obvious that by appropriate switching of a lesser number of input variables to the registers, recordings over longer periods, or at closer intervals, can be accomplished; similarly, by switching or by providing duplicate rows of registers, more input variables can be recorded within the same film-size limitations.

The invention will now be described in detail in connection with a preferred embodiment thereof, given by way of example and not intended as a limitation of the scope of the invention. In the accompanying drawings.

Figures 1, 2:
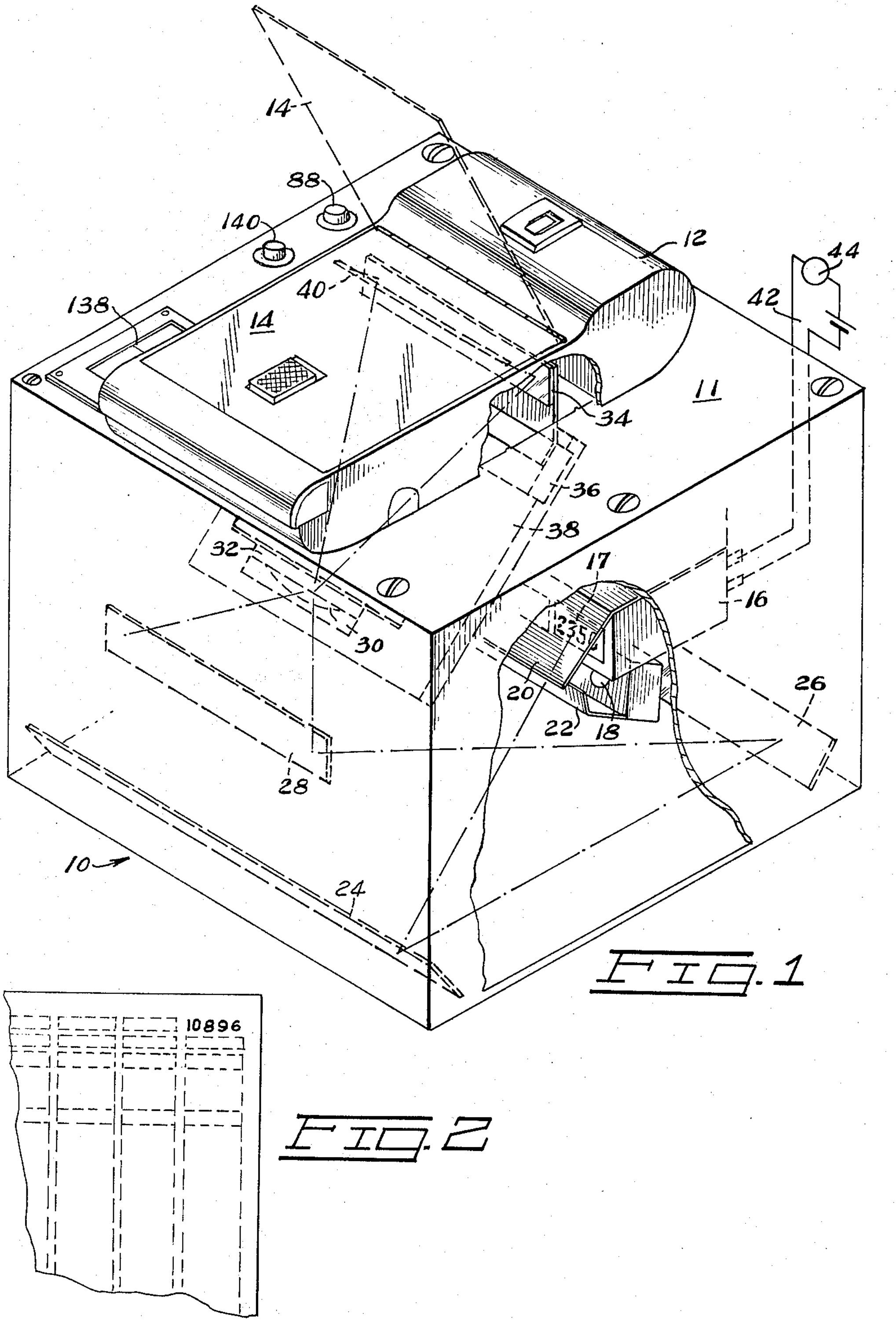
FIG. 1 is a perspective view, partly broken away, of a particular embodiment of the invention.
FIG. 2 is a fragmentary view of a portion of a completed digital print record as produced by the invention.

Referring now to FIG. 1 of the drawings, numeral 10 designates a substantially light-tight housing of sheet metal or the like, having an exposure opening or passage in its top wall 11, to which is removably mounted the black portion 12 of a conventional Polaroid camera. As known, the film exposure area of such a camera lies beneath a hinged door 14 from which is removed a finished positive print after exposure and suitable manipulations.

In the form being described, the apparatus is designated to record, in successive crosswise lines on the stationary sensitive material, the numerical readings manifested by a row of counters or indicators 16 mounted on a suitable chassis within the housing 10. The entire row of counters is imaged in a single such line, and after a suitable interval, the new readings are imaged in a succeeding line, as indicated by the section of a finished print shown in FIG. 2 to a magnified scale. It is desirable that the readings be arranged on the final print to a fixed scale and without distortion or misalignment over the whole print area, and the invention accomplishes this in a very simple but efficient manner.

Counters 16 may conveniently be of the 5-digit message register type used in telephone exchanges, exhibiting as at 17 white numerals on a dark ground, but a reversed arrangement may equally well be employed. Where, as here, the counter indications are not self-luminous, they are illuminated as by a row of small electric lamps 18 whose direct rays are shielded from the remainder of the interior of housing 10 as by sheet metal shields 20 and 22, having their proximate edges vertically spaced but horizontally overlapped to define an exposure "slit" through which the image rays pass to a first strip reflector 24 secured as on an internal chassis which supports all of the mechanism within the housing. Stray light is trapped by providing all of the chassis and mounting parts with the usual dull black finish of optical apparatus, but the inner sides of shields 20 and 22 may be made white or reflective to increase the illumination on the register faces.

It is desirable to reduce the scale or size of the digital images to give the most compact recording, and to this end the optical path from the counters to the lens is "folded" to give a long object-distance within the given housing dimensions. Thus, the rays proceed from reflector 24 to a tilted strip reflector 26, and thence to a tilted strip reflector 28, mounted near opposite walls of the housing. From reflector 28, the rays enter a lens 30 and shutter device 32 of conventional form, the lens axis being directed preferably at a 45 degree angle to the top wall 11 of the housing and to the film plane which is parallel to that wall. Since the lens position is fixed, the optical object distance (to the counter numerals 17) is constant, and a fixed optical focus (and reduction ratio) will be obtained if the image distance (from lens to film) is also kept constant.

This requirement is satisfied by positioning between the lens 30 and the film a movable strip reflector 34 whose reflecting plane is vertical and which will therefore reflect the rays from the lens through a 90 degree angle onto the film area. This reflector 34 is mounted for stepwise motion parallel to itself by a carriage 36 slidable stepwise along a guideway such as 38 positioned parallel to the axis of the lens. The step increments are selected so as to space the successive row images regularly along the film area. Thus, in the position shown in FIG. 1, the reflector 34 is at its position closest to the film, and will expose a first fractional film strip area indicated at 40. As the carriage 36 moves stepwise down its guides, the rays will expose successive other strips of the film frame area, moving farther away from the film but closer to lens 30, in such a way as to keep the image distance constant.

The components for providing the stepwise motion of the carriage 36, and various operating controls, will be described below, but FIG. 1 indicates schematically a typical electrical input to one of the counters, via a circuit 42 including a battery and a pulse generator 44 such as the contact mechanism of a revolution counter, anemometer, speedometer or other transducer, intended to be merely representative of a plurality of suitable data sources connected to the various counters or indicators 16.

Figure 3:
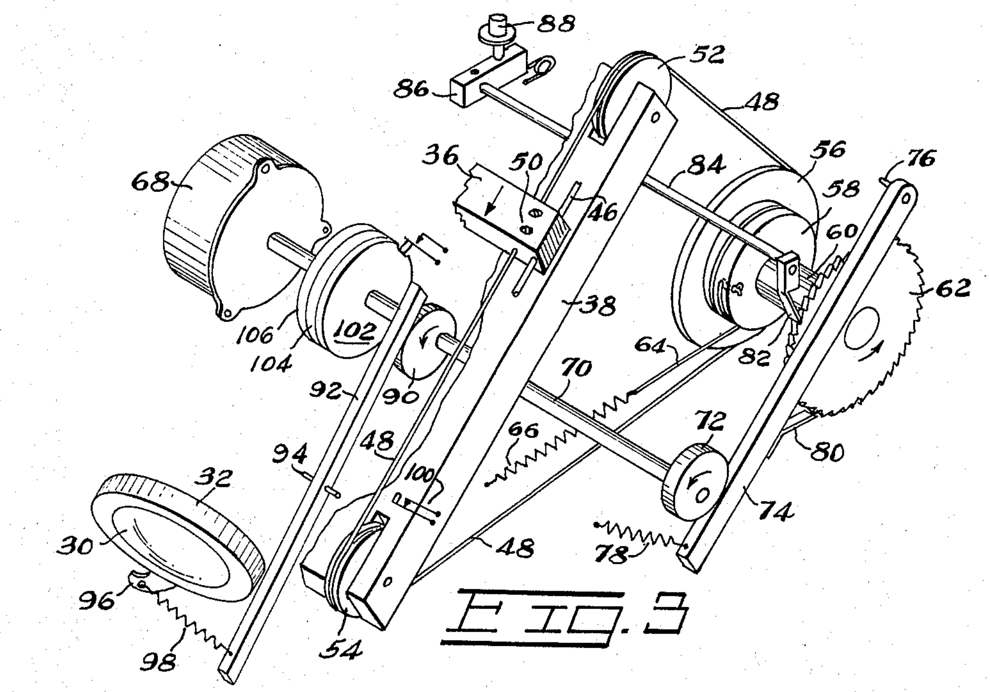
FIG. 3 is a schematic view, in perspective, of the significant portions of the apparatus for producing the periodic exposures of the film record.

The arrangement for moving the strip reflector 34 stepwise along a path at a 45 degree angle to the film plane is detailed in FIG. 3, which again shows the inclined support, track or guideway 38 along which slides the mirror carriage 36. The upper surface of support 38 is polished to reduce friction, and one or more guide rods 46 are secured at their ends to support 38 or other fixed chassis components, and pass through apertures in the carriage to hold it slidably against the trackway.

A flexible, inextensible and endless cord or cable 48 is secured to carriage 36 as by screws 50, and passes over pulley wheels 52, 54 pivoted freely within slots at the ends of support 38. Thence, the cable passes about a frictional drive sheave 56 secured to a drum 58, both of which are fast on a shaft 60 which also carries a ratchet wheel 62. The shaft is suitably journalled in plates forming part of the fixed inner chassis or framework. A cable 64 is secured at one end to drum 58 and wrapped about it, terminating at a tension spring 66 which connects it to a fixed point on the chassis, so as to bias drum 58 (and hence sheave 56) in one direction. For example, and as shown, spring 66 urges the drum in the direction to move mirror carriage 36 toward the upper end of inclined support 38.

Stepwise motion of carriage 36 down the support 38 is accomplished by a motor 68 which is arranged to execute one complete rotation of its shaft 70 upon each occurrence of a timing pulse in a manner to be described below. At its extremity, shaft 70 carries an eccentric cam 72 whose rotation gives a slight oscillation to a drive arm 74 pivoted to the chassis at 76 and urged against the cam by a spring 78. Arm 74 carries a tooth or drive pawl 80 that is normally out of engagement with ratchet wheel 62, but which engages the ratchet and drives it one tooth space during each revolution of the motor shaft. Retrograde motion of the ratchet (and hence of carriage 36) is prevented by a restraining pawl 82 which can be withdrawn, to reset the carriage to its original upper position, by a slight rotation of a shaft 84. For example, the shaft 84 is journalled in the chassis and has an operating arm 86 which is spring-urged counter-clockwise but can be engaged by a reset button 88 passing through the top wall 11 of the outer housing (see FIG. 1). Resetting will normally follow the complete exposure of a film frame and its removal from the camera.

During each revolution of motor shaft 70, a second cam 90 engages one end of a shutter operating arm 92 pivoted on the chassis at 94, and tilts the arm so as to operate the shutter release lever 96, through tension spring 98, to make a snapshot exposure in the usual way. The lens-and-shutter combination may be fixedly mounted at the lower end of support 38 as better seen in FIG. 6 of the drawings.

Upon completion of the exposure of all the transverse row areas of one film frame, and when carriage 36 thus reaches the lower extremity of its travel, a limit switch 100 is engaged by the carriage to open the circuit of motor 68 and thus to prevent further movements of the ratchet wheel 62 and operations of the shutter. A series of cams 102, 104 and 106 are secured to motor shaft 70 to control switch contacts (to be described below) and thus establish the correct operating sequence of the equipment components.

Figure 4:
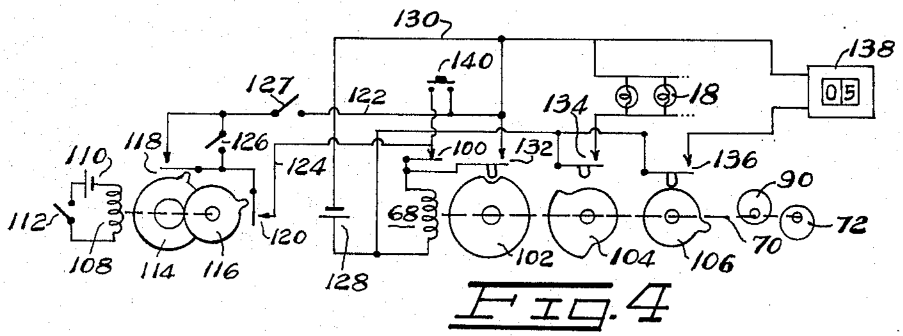
FIG. 4 is a diagram of the exposure interval timing and motor drive for the various functions of the apparatus.

FIG. 4 is a diagrammatic view showing the sequence control components and electrical connections of the apparatus. At the left, a conventional timer is represented by a small timer motor 108 energized as by a battery 110 through on-off switch 112. The motor shaft may carry, for example, a pair of geared cam discs 114, 116 which periodically close timer contacts 118, 120. Typically, disc 114 may close contact set 118 once each hour, and disc 116 may close contact set 120 once each quarter-hour. The resulting momentary timing-circuit closures of leads 122, 124 (when "recording" on-off switch 127 is closed) occur once each hour when interval-selector switch 126 is manually set in its open condition, since cam contacts 118 and 120 are thus placed in series. With selected switch 126 set in its closed position, circuit closures will occur every 15 minutes. In either case, the closures are momentary, but employed merely to imitate a rotation of drive motor 68 whose cam contacts thereupon assume control of the operation cycle.

Figure 5:
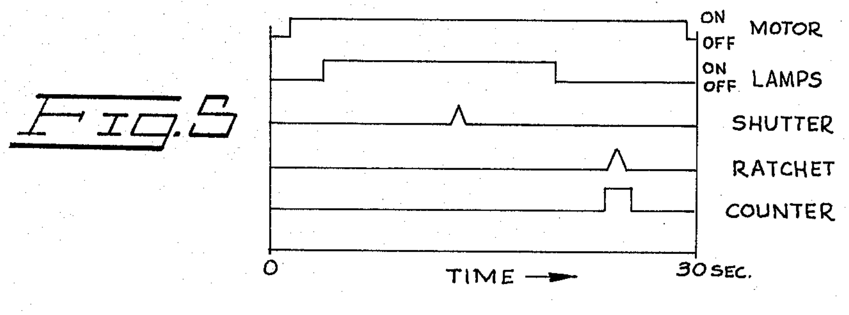
FIG. 5 is a chart showing a typical operating sequence for the events related to the making of each line exposure.

Thus, with the timer in operation, a circuit closure between leads 122 and 124 completes a circuit from source 128 through the winding of motor 68, normally closed limit switch 100, lead 124, the timer contacts, lead 122, and bus 130 back to source 128, and motor shaft 70 commences to rotate. A contact set 132 operated by one-revolution cam 102 immediately closes, to maintain the motor 68 energized by shorting leads 122 and 124 until completion of one full revolution. As charted in FIG. 5, this revolution will typically require about 30 seconds.

Shortly after commencement of this one-revolution cycle, cam disc 104 closes its contacts 134 to energize lamps 18 and thus illuminate the registers 16 already described. At a slightly later time, see FIG. 5, continued rotation of the motor shaft causes cam 90 to operate shutter 32, allowing the register faces to be imaged on the first transverse row or strip 40 (FIG. 1) of the film material. The lamps are then turned off by cam 104. As shaft rotation continues, cam 72 oscillates arm 74 (FIG. 3) to advance the ratchet wheel 62 one step and thus move carriage 36 and reflector 38 to a position in readiness for the exposure of the next row. A third cam disc 106 also operates a contact set 136 to pulse the exposure-counter 138 (see also FIG. 1) and thus to indicate externally the extent to which the film frame has been used up.

Upon completion of a full revolution of motor shaft 70, contacts 132 are allowed to open, de-energizing the circuit to motor 68, since the timer contacts 120 and 118 reopened shortly after the commencement of the described cycle of operations. The second exposure will be initiated in the same way by the next closure of the timer contacts. However, an additional exposure can be made, as desired, by momentary operation of a manual switch 140 (see also FIG. 1) connected between leads 122 and 124. Switch 140 is also employed, with the timer switches 112 and/or 127 opened, when a series of exposures under purely manual control is desired. The way in which limit switch 100 interrupts the motor circuit, when the film frame has been filled with recorded images, is obvious from FIG. 4.

Figure 6:
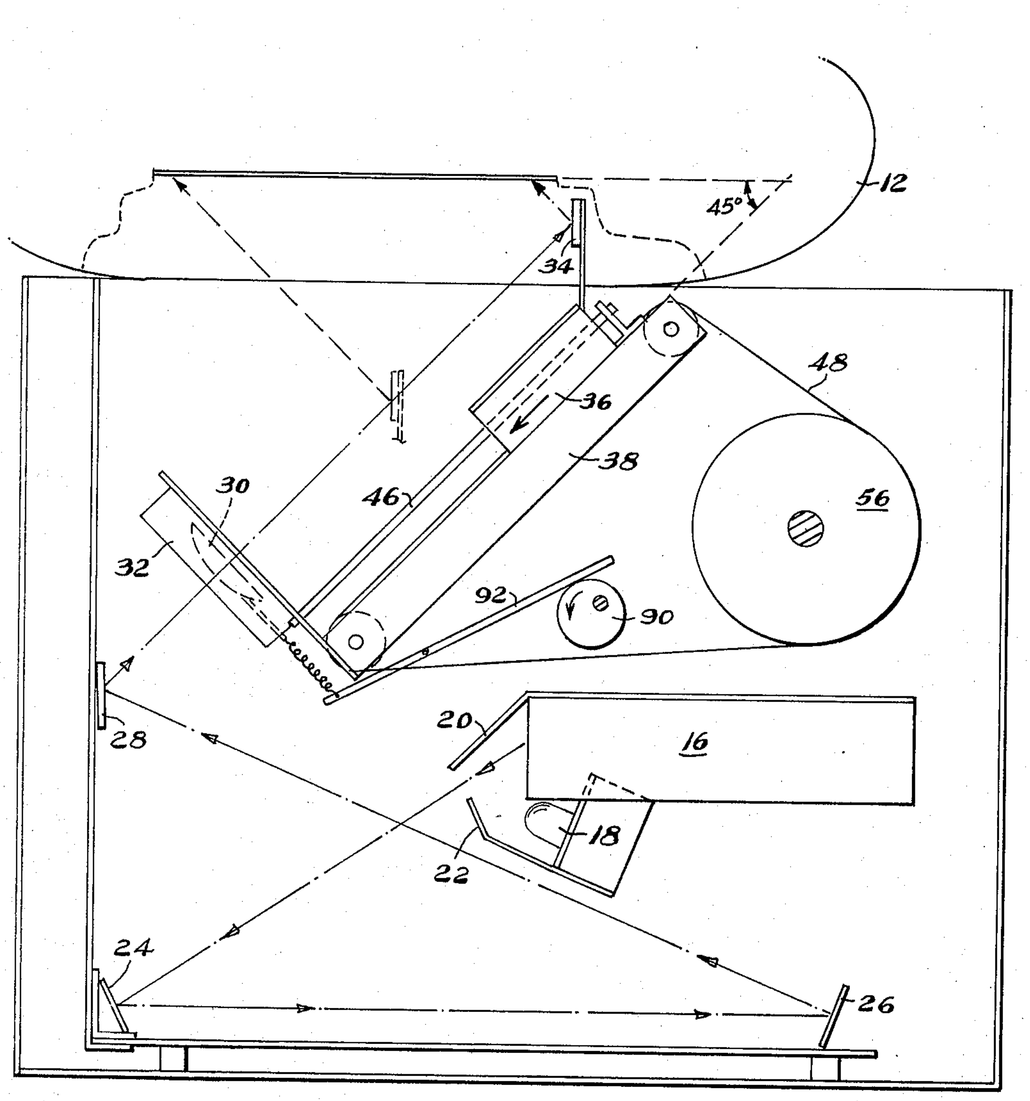
FIG. 6 is a simplified side elevation of the apparatus showing the geometrical arrangement of certain parts, one side of the housing being removed and parts being omitted for clarity of understanding.

FIG. 6 shows more clearly the preferred optical path in the equipment. The "folding" between registers 16 and reflectors 24, 26 and 28 establishes the desired long object-distance in a moderate size of housing, and the 45-degree angle of the travel path of reflector 34 ensures constancy of the image distance for proper focus on the film plane.

Various modifications are, of course, possible in practice. The spring bias for return of carriage 36 to its upper or "reset" position may be provided by a helical spring about shaft 60 in FIG. 3. Control of the lamps and shutter may be electromechanical by the use of relays, solenoids and the like, and the stepwise motion of carriage 36 may also be obtained in other ways. The timing pulses may be generated remotely over wire or even radio circuits or the like, and may be regular, upon human command, or synchronized with other operations related to the problem at hand. The device may be made completely portable by the use of small batteries for powering motors 68 and 108 and the lamps 18, or it may be supplied with components suitable for operation from any available power supply circuits.

An important special advantage of the arrangement of the counters or indicators 16 relative to the reflecting system is readily perceived in FIG. 6 of the drawings. Such counters, as commercially manufactured, are of course normally intended to be viewed from the front, and it is very desirable to utilize commercially available counters or indicators. However, the system described herein for maintaining constant the image distance from lens to film plane, involves the arrival of the rays from reflector 34 at an angle of 45 degrees to the film plane. The resulting "keystone" effect would cause the numeral indications on the film to be distorted, and even out of focus, crowded or blurred at one end of each numeral.

By placing the counters or indicators as indicated in FIG. 6, so that their numerals or other indications are actually viewed by the first reflector 24 at an angle relative to the counter faces that may approach 45 degrees (though it need not be precisely of this value), the images of the numerals are in a sense "pre-distorted" in the proper sense to compensate for the effect described above. The resulting images on the film are of proper shape, in exact focus at both ends, and present a highly legible record even in its reduced and compact format.

The foregoing and other variations of an obvious or expedient nature are intended to be included within the true scope of the invention, whose limits of exclusion are defined in the appended claims.

What is claimed is:

1. A data recording camera comprising a light-tight housing, means for supporting a flat sensitive film in fixed position relative to the interior of said housing, a data-manifesting device fixed in said housing, means for illuminating said device, and an optical system for imaging the manifestations of said device successively upon adjacent areas of a film positioned by said supporting means, said optical system including a lens fixed with respect to said film supporting means and positioned to direct rays from said data manifesting device along a path inclined at a 45 degree angle to the plane of the film, a ray reflector mounted for movement along said path, said reflector being oriented at a 45 degree angle to said path to direct said rays perpendicular to said path and onto the film, and means for periodically stepping said ray reflector along said path to image on successive adjacent portions of the film a constantly-focused representation of the data manifested by said device.

2. A data recording camera according to claim 1, in which said data-manifesting device includes a plurality of side-by-side data-manifesting units positioned to have their indications imaged to column formation on the film.

3. A data recording camera according to claim 1, in which said optical system includes a shutter adjacent said lens, and means for operating said shutter in timed relation to the operation of said stepping means.

References Cited by the Examiner

UNITED STATES PATENTS 3,106,880 10/1963 Rossetto et al. -------- 95—4.5

NORTON ANSHER, *Primary Examiner.*

R. A. WINTERCORN, *Assistant Examiner.*